(No Model.)

W. H. WALKER.
DIE FOR WELDING DRAFT EYES TO HAMES.

No. 376,998. Patented Jan. 24, 1888.

WITNESSES:
H. S. Reeve.
C. R. Bennett.

INVENTOR:
William H. Walker,
BY Draker & G. ATTY'S.

UNITED STATES PATENT OFFICE.

WILLIAM H. WALKER, OF MILFORD, CONNECTICUT.

DIE FOR WELDING DRAFT-EYES TO HAMES.

SPECIFICATION forming part of Letters Patent No. 376,998, dated January 24, 1888.

Application filed July 1, 1887. Serial No. 243,080. (No model.)

*To all whom it may concern:*

Be it known that I, WILLIAM H. WALKER, a citizen of the United States, residing at Milford, in the county of New Haven and State of Connecticut, have invented certain new and useful Improvements in Dies for Making Hames; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
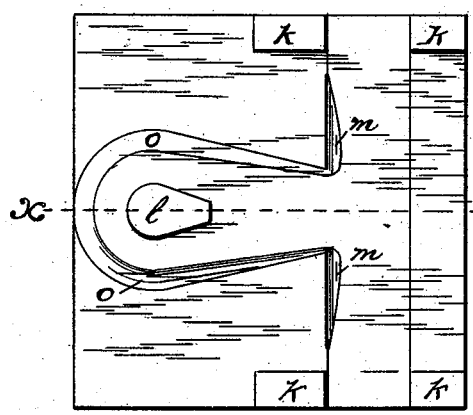
Figure 2:
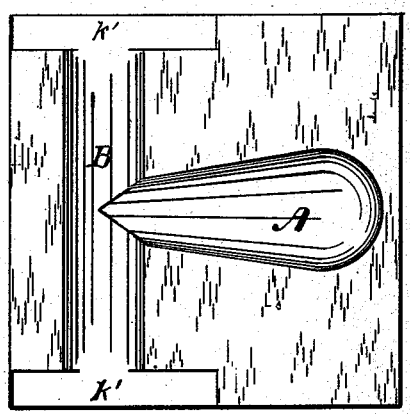
Figure 3:
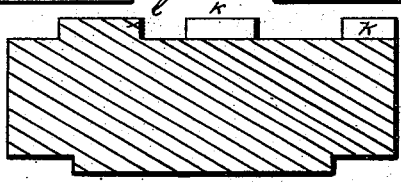
Figure 4:
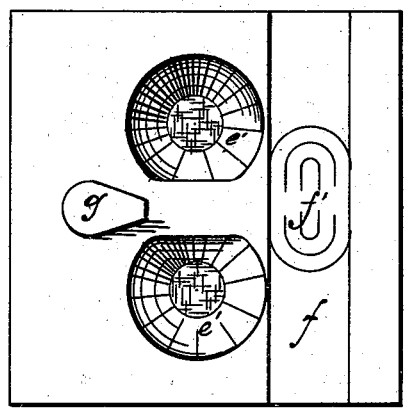
Figure 5:
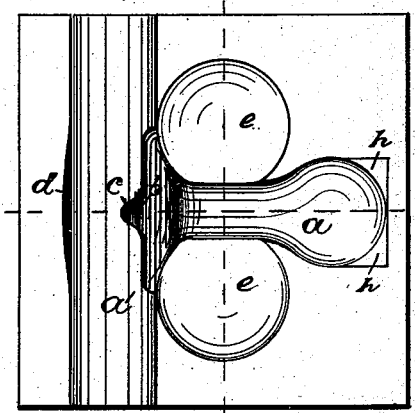
Figure 6:
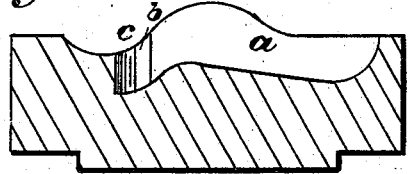
Figure 7:
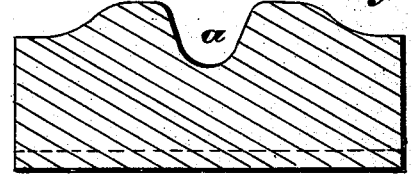

In said drawings, Figures 1 and 2 represent plan views of a top and bottom die, respectively, for executing the welding and finishing process embodying my improvement. Fig. 3 is a section through line *x* of Fig. 1. Figs. 4 and 5 represent plan views of a top and bottom die, respectively, for executing the clinching and partial forming process embodying my improvement. Fig. 6 is a section through line *y* of Fig. 5, and Fig. 7 a section through line 2 of the same figure.

Similar letters of reference indicate corresponding parts in each of the several figures wherever they occur.

The object of this invention is to do the work more perfectly and with less labor than heretofore.

The dies comprise two sets—one for forming and clinching and the other for the welding process. The first comprises a bottom die, Fig. 5, having recesses *a* and *a'*, corresponding, generally, to the outside of the rounded portion of the draft-eye and of the hame-body, the latter recess extending across the die at right angles to the former, said bottom die also having deeper recesses, *b c*, at the point which is commonly called the "neck," where the draft eye and hame-body join, and also a recess, *d*, formed in the edge of the semicircular recess or groove for the hame-body. There is also formed on said bottom die two projections, *e*, at the opposite sides of the first-named recess close to where the hame-body and draft-eye join, the object of which will be hereinafter stated.

The top or upper die, Fig. 4, is provided with two recesses or cavities, *e'*, corresponding in their contour with the projections *e* on the lower die, and a recess, *f*, extending across the die, which, when the dies are brought into conjunction, will coincide with the groove *a'* in the lower die. It also has a projection, *g*, which serves as a punch to form the clip-hole at the end of the draft-eye, as will be understood. The recess or groove *f* is also broadened and deepened, as at *f'*, at the sides and bottom thereof, which serves the purpose of causing the metal to spread and form slight bosses on the flat surface of the hame-body, thus increasing the amount of stock at the welding-point, and thereby increasing the strength of the weld. The recess *d* at the side or edge of the other die is for the same purpose, and also for the purpose of causing the stock to clinch around the rounded side of the hame-body to aid in holding the parts together while taking the welding heat. The projections *e* serve the several purposes of guides to facilitate the laying of the draft-eye stock in position, to upset and strengthen the draft-eye at the neck, to prevent the stock from spreading, and also to force the stock into the deeper recesses, *a*, *b*, and *c*. The recesses *b c* in the die are for the purpose of causing the draft-eye stock to form and clinch around the hame-body at the neck, or where it joins said hame-body, to secure the requisite amount of metal at that point to form the "finger," "anchor," or "London" draft-eye, as the case may be.

At the end of the recess for the draft-eye stock are formed additional recesses, *h h*, which serve as guides to facilitate the placing of the draft-eye stock in position in the die preparatory to the forming and clinching process.

The bottom die of the welding-dies, Fig. 1, is provided with guides *k* and *l* to aid in laying and holding the hame and draft-eye stock in the proper position on the die, and with recesses *m*, formed along the edge of the bed for the hame-body at each side of the space for the neck, the object of which is to secure a surplus of metal and increased strength at those points. A recess, *o*, is for the purpose of providing room for the spread of the metal, so that the dies will come close together and the "flash" will be as thin as possible after the welding, &c., is done.

The guides *k* may be formed as a part of the die, as herein shown, or they may be a separate fixture attached thereto, as may be preferred.

The mode of operation is as follows: The hame-body is first laid in the die, Fig. 5, in the groove $a'$ provided for it, cold. The draft-eye stock is then brought to a red heat, and is laid in its position—viz., the recess or cavity $a$ in the die—said piece being of sufficient dimensions to cover and fill the recess prepared for it, and also to extend across the hame-body. Then the upper die is immediately brought down with sufficient force to drive the metal into the respective grooves and recesses hereinbefore described, to sink the cold hame-body into the heated draft-eye stock, and also to punch the clip-hole half-way through, or as far as the punch will make it. This operation imparts the general form to the draft-eye, upsets the metal at the proper points, punches the clip-hole, and thoroughly clinches the draft-eye stock around or to the hame-body, leaving a redundancy of metal at the points desired, for the purposes described. The parts thus joined are then put into the fire and brought to a welding heat, when the second set of dies are brought into use, the parts being laid flat side down on the bottom die, Fig. 1, the projection $l$ and the guides $k$ serving to hold the stock in its proper position, as will be understood. The top die is then brought down with sufficient force to thoroughly weld and completely form and finish the draft-eye and hame-body, except a thin film or flash which may be left at the edges, and which is subsequently trimmed off with a suitable tool.

The mate or top die is provided with recesses A B, corresponding in shape and size with the draft eye and hame-body, and with recesses K' at the opposite ends of the recess B to receive the guide projections K of the mate die, as will be understood.

Having thus described the invention, what I claim as new is—

1. Dies for partially forming and clinching a draft-eye to a hame-body, consisting of a die having recesses or cavities $a$ and $a'$, corresponding substantially with the dimensions of a draft-eye and hame-body, a projection, $e$, at each side of the cavity $a$, near its junction with the cavity $a'$, and recesses or cavities, as $b\ c$, at the junction of the cavities $e'\ e'$, to receive the projections $e$ on the opposite die, recesses $f\ f$, and a punch projection, $g$, all being disposed and arranged to operate substantially as and for the purposes set forth.

2. Dies for welding a draft-eye to a hame-body, one of which is provided with a projection or punch, $l$, to punch the hole for the trace-clip, a recess or cavity, $o$, partially surrounding said punch, guide projections $k$ at the opposite sides of said dies and recesses, and the other with recesses A B, corresponding in size and shape with those of the draft-eye and hame-body, and with recesses K' at the opposite ends of the recess B, all being disposed upon the face of said dies substantially as shown and described, for the purposes set forth.

In testimony that I claim the foregoing I have hereunto set my hand this 19th day of May, 1887.

WILLIAM H. WALKER.

Witnesses:
CHARLES H. PELL,
OSCAR A. MICHEL.